US005931584A

United States Patent [19]

Becker et al.

[11] Patent Number: 5,931,584

[45] Date of Patent: Aug. 3, 1999

[54] RUNNING WHEEL BLOCK

[75] Inventors: Eberhard Becker, Hagen; Udo Gersemsky, Herdecke; Winfried Gievers, Wetter; Klaus-Peter Hoffmann, Schwerte; Karl Liebig, Wetter; Bernd Neupert, Wetter; Hans-Hermann Osthoff, Wetter; Thomas Schweflinghaus, Wuppertal; Roland Staggl, Wetter; Karl Zacharias, Schwerte, all of Germany

[73] Assignee: Mannesmann AG, Düsseldorf, Germany

[21] Appl. No.: 09/062,980

[22] Filed: Apr. 20, 1998

Related U.S. Application Data

[63] Continuation of application No. PCT/DE96/02023, Oct. 18, 1996.

[30] Foreign Application Priority Data

| | | | |
|---|---|---|---|
| Oct. 18, 1995 | [DE] | Germany | 195 40 220 |
| Oct. 18, 1995 | [DE] | Germany | 195 40 215 |
| Oct. 18, 1995 | [DE] | Germany | 195 40 216 |
| Oct. 18, 1995 | [DE] | Germany | 195 40 217 |
| Oct. 18, 1995 | [DE] | Germany | 195 40 219 |

[51] Int. Cl.$^{6}$ .................................................. F16C 29/04

[52] U.S. Cl. .............................................. 384/59; 384/449

[58] Field of Search .............................. 384/59, 449, 547, 384/49, 58

[56] References Cited

U.S. PATENT DOCUMENTS

| | | | |
|---|---|---|---|
| 4,682,901 | 7/1987 | Hauber | 384/449 |
| 5,468,070 | 11/1995 | Riedel et al. | 384/449 |

*Primary Examiner*—Lenard A. Footland

*Attorney, Agent, or Firm*—Cohen, Pontani, Lieberman & Pavane

[57] ABSTRACT

A running wheel block, including a housing having at least one connecting surface for connection to a supporting structure, two inwardly directed rotary bearing holding hubs arranged in the housing, rotary bearings mounted on the hubs, a running wheel mounted in the rotary bearings so that a section of its running surface projects from the housing toward at least one side and a cover connected to the housing so as to close the housing. The holding hubs include a first holding hub that is arranged on the cover. The cover has centering members for fixing a position of the holding hub relative to an axis of the running wheel when the cover is closed.

13 Claims, 6 Drawing Sheets

RUNNING WHEEL BLOCK

This is a continuation application under 35 U.S.C. §111 and 37 C.F.R. §1.53 of international PCT Application No. PCT/DE96/02023 which was filed on Oct. 18, 1996, published as publication NO. WO 97/14645 on Apr. 24, 1997, and claims priority from German Applications Nos. 195 40 220.0; 195 40 215.4; 195 40 216.2; 195 40 217.0 and 195 40 219.7 all filed on Oct. 18, 1995.

BACKGROUND OF THE INVENTION

1. Field of the Invention

The invention relates to a running wheel block with a housing with at least one connecting surface.

2. Discussion of the Prior Art

A running wheel block of this type is known from German reference DE 31 34 750 C2. This known running wheel block is composed of two halves of the bearing housing, which are welded together or otherwise connected to each other, and has inwardly pressed pivot bearing seats for bearings that support the hub of the running wheel. Attached to the pivot bearing seats are stop faces for the bearings, which stop faces are directed toward the hub. The hub of the running wheel extends over the bearings and rests directly over them on the housing. The housing, on its outer rings on both sides, has ring grooves for snap rings located on the bearing fronts, and also has a holding hole with internal toothing for the external toothing of a drive shaft. This design has been in successful use for years. However, the need to minimize costs and improve function still exists.

In the known running wheel block, it is disadvantageous that, to exchange the running wheel, the running wheel block in its entirety must be completely removed from the supporting framework.

After the running wheel is exchanged, the entire running wheel block is reattached to the supporting framework, exactly as during the initial assembly, by means of screws. For this purpose, the position of the running wheel block, relative to the supporting framework with the other running wheels, must be oriented so that the rotational axis of the running wheel runs at a right angle to the path on which the running wheel rolls. Due to this complicated orientation procedure, assembly is time-consuming and, because of the lengthened down time, cost intensive. If the orientation procedure is not carried out, the danger exists that the running wheels will abrade as the result of skewed running on their path and will thus become worn more quickly. Further, when the application involves a bridge crane, the danger exists that the performance of the sensitive bridge crane will be disrupted by skewed running, canting or wheel flange wear. In addition, as the skewed running angle increases, lateral forces arise, which place stress, in addition to the operating stress, on the supporting framework or the like.

Further, French reference FR A 2667543 describes a running wheel block with a housing that consists of two housing halves, which jointly form the connecting surface on one side of the housing. To exchange parts subject to wear, this running wheel block must also be completely removed from the supporting framework and disassembled.

Thus, after reattachment of the running wheel block, a new orientation and adjustment procedure is required.

SUMMARY OF THE INVENTION

Accordingly,it is an object of the present invention to provide a running wheel block in which it is possible to exchange parts subject to wear without removing the running wheel block from the supporting framework. In addition, manufacturing and assembly costs are to be minimized by a further embodiment of a running wheel block, and customer benefits are thus to be increased.

Pursuant to this object, and others which will become apparent hereafter, one aspect of the present invention resides in arranging one of the two provided holding hubs on a cover that closes the housing. This cover is connected to the housing, can be detached in the installed state, and is equipped with centering means that, when the cover is closed, fix the position of the holding hub relative to the running wheel axis. To attain an advantage in accuracy during assembly, the centering means are designed as centering hubs that engage into corresponding bores in the housing.

It is thus proposed that the running wheel block have a housing with at least one connecting surface for connection to a supporting framework. The housing need not be completely removed to exchange parts subject to wear, so that the housing remains attached to the supporting framework in a substantially oriented fashion.

The cover closes an opening on one side of the housing, so that, because of the holding hubs arranged on the cover, it is possible to remove and reinstall parts subject to wear, e.g., the rotary bearing and the running wheel, in a very simple fashion. The requirement of allowing exchanges without readjustment is met, in conjunction with the specially designed cover, by the fact that, upon attachment of this cover, the position of the holding hub relative to the running wheel axis is determined via the centering means. The cover performs a housing function, but nonetheless remains a cover that closes the housing.

In another embodiment, a block-type housing has at least one head connecting surface, which absorbs the carrying force and extends roughly to the housing width or the running wheel width. The connecting means between the housing and the supporting framework, carrier, travelling frame or the like to be connected to the running wheel block is arranged on the side of this head connecting surface. The present invention permits the exchange of the running wheel and/or bearing without having to remove the housing from the supporting framework. As a result, the time-consuming and cost-intensive orientation procedure following the exchange of parts subject to wear is dispensed with. The housing can continue in use and remains oriented on the supporting framework or the like as long as desired. Further, there is the advantage that in addition to detachable connecting means, it is also possible to use non-detachable connecting means, because the block-type housing no longer needs to be removed from its carrier or travelling frame.

It is also advantageous that the newly developed running wheel block can be broken down completely into its parts and recycled. This is especially advantageous in view of rising waste disposal costs and disposal according to material.

According to further embodiments, the head connecting surface and/or a cheek surface and/or a front connecting surface are divided into supported and non-supported partial surfaces. As a result, the introduction of force becomes more defined than before, and there are considerable savings in the metal removal rate and metal removal volume during the manufacture of the running wheel block.

It is also advantageous that one supported partial surface is not divided, i.e., has no partition line. Given a homogeneous material and smaller partial surfaces as connecting surfaces, the evenness of the surface is more precise than in the case of multiple or larger partial surfaces. Furthermore, forces are introduced into the connecting structure in a defined manner via the smaller partial surfaces. This allows an optimized design of the connecting structure in the case of a known force flow.

According to further features, a detachable cover is attached to at least one side of the housing. In the operating position, this detachable cover is centered relative to the rotary bearing seats. As a result, it is possible to laterally remove the bearings and/or the running wheel. Such lateral removal reduces the cost of disassembling and assembling the running wheel, because the supporting framework, carrier or travelling frame needs to be elevated only to the wheel flange height of the running wheel.

In yet another embodiment the head connecting surface has one or more through holes. The running wheel radius can therefore be advantageously enlarged by more than the thickness of the upper plate limit. It is also advantageous that the through hole prevents contaminating deposits in the event that the open side of the housing, from which the running wheel projects, is directed opposite to the direction of gravitation (i.e., is directed upward).

However, it is also possible for the through holes to be closable by means of closing pieces, which do not need to be manufactured from the same material as the housing, because they do not absorb carrying forces and need not have the same stress capacity. The closing pieces prevent the penetration of dirt or other impurities, even in the event that the open side of the housing, from which the running wheel projects, is directed in the gravitational direction (i.e., is directed downward).

In a further embodiment of the invention, the head connecting surface has at least one recess that runs parallel to the running wheel axis. This allows prefabricated bolts to be used. This in turn permits the hole pattern of the counterpiece to be imprecise without leading to disadvantages, because the bolts can move in the recess and adjust to the imprecise hole pattern.

The aforementioned recess can also be designed as a channel guide, through bore, or threaded bore. The suitable type of through hole can be selected in accordance with the precision of the connection.

In yet an additional embodiment channel nuts for connecting screws can be run in the channel guides in a cross-adjustable manner and with little play. This embodiment thus facilitates the connection and orientation between the supporting framework, carrier, travelling frame or the like and the housing of the running wheel block during initial assembly.

The structure of the housing is asymmetrical, whereby at least one cheek surface can be closed by a cover and the housing width is a multiple of the thickness of the cover. A cover of this type has various advantages, because, as a simple, plate-like part, it can be designed in various manners. It serves for the formation of locks and the attachment of sensor elements and can be embodied as an adapter for connection to a drive unit.

The basic assumption of the invention is that the width of the housing is two to forty times the thickness of the cover. It is therefore possible to encompass a series of housing gradations.

Easy disassembly of the cover is ensured by the fact that the cover is placed lower, relative to the head connecting surface. The same advantage results when the cover is embodied so as to stand back at least relative to one front connecting surface.

Advantageous force transmission is ensured by the fact that the cover is equipped with centering hubs, which engage into corresponding bores of the housing.

In a further embodiment the cross-section of the cover becomes thicker outside of the running wheel diameter. Attachment means, spacing means and the like can be located in these areas. The material necessary to do so is available to an adequate extent at these points. Accordingly, it is advantageous to arrange sinks for screw heads and nuts in the thicker cross-section of the cover. The attachment means can advantageously consist, for example, of sinks having a hexagonal shape and, in alternating fashion, accommodating either an internal hexagonal head or a hexagonal nut.

Furthermore, the centering hubs have inner borings to hold carrying bolts that run concentric to the centering hub. This design contributes to good force transmission for the purpose of supporting the reaction forces in the housing of the running wheel bock.

Technical manufacturing advantages also result from the fact that the common axis of the centering hubs, the corresponding borings in the housing and the inner borings runs parallel to the running wheel axis outside of the circumference of the running wheel. This is a low-tolerance system and can therefore be manufactured economically.

In a further embodiment of the invention, a holding hub for a rotary bearing to hold the inner ring or the outer ring is embodied in the housing on the side opposite to the cover. As a result, the rotary bearing can be easily brought into its exact tolerance-correct position by suitable manufacturing technology.

According to another embodiment, a holding hub for a rotary bearing is embodied on the cover to accommodate the inner ring or the outer ring. This measure, too, is advantageous with respect to manufacturing technology as well as to simple assembly and disassembly.

According to still other embodiments, holding means for connecting means are located on the head connecting surface and/or the outer front connecting surfaces of the housing. The holding means allow the connecting means to be adjusted in keeping with the setting of the entire running wheel block.

In addition to the channel guides with channel nuts provided on the head connecting surface, recesses are provided on the front connecting surfaces of the housing. As a result, additional elements can be attached without permanently configuring the front connecting surface. It is also possible to attach the entire wheel block located on this front connecting surface of the housing to a carrier or travelling frame or the like.

In still another embodiment, the recesses are generally embodied, respectively, as channel guides, through borings or threaded borings. Depending on which connecting means and which holding means, in combination, produce the most advantageous assembly and the most precise possible positioning, the suitable combination can be selected.

Furthermore, at least one partial connecting surface is formed on the outer surface of the housing (from which the running wheel projects) opposite to the head connecting surface. Therefore, it is also possible to attach other aggregates, e.g., guide rolls, measurement devices and the like, to this partial connecting surface. This partial connecting surface can also be embodied so that the entire running wheel block located on this surface can be connected to the supporting framework, carrier or travelling frame.

For the attachment of further aggregates, it is advantageous that the outer front connecting surfaces of the housing be undivided and respectively constitute surfaces to absorb carrying forces.

Further, to obtain an accurate position and avoid errors in mounting, the cover is connected to the housing in a positive-locking and/or force-locking manner by connecting means and centering hubs.

To avoid corrosion and to save weight, it is proposed that the housing and/or the cover be made of a material processed in a molten state. In particular, light metal materials and plastics can be used.

To ensure that a given component has the desired stress capacity, the material can consist of a light metal alloy.

It can also be advantageous for the material to be an iron alloy, if such strengths are required.

For economical processing, it can be advantageous for the material to consist of a plastifiable plastic.

In this regard, it can be desirable to attain both adequate strength and low weight in the components. For this purpose, it is proposed that the material be a composite material or form a composite material with other materials.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawings show:

FIG. 8A is a side view looking at the cheek of the wheel block, which is attached to a carrier, travelling frame or the like;

FIG. 10A is a cross-section at the level of the carrying bolt in an alternative embodiment of the carrier, travelling frame or the like;

DETAILED DESCRIPTION OF THE PREFERRED EMBODIMENTS

Figure 1A:
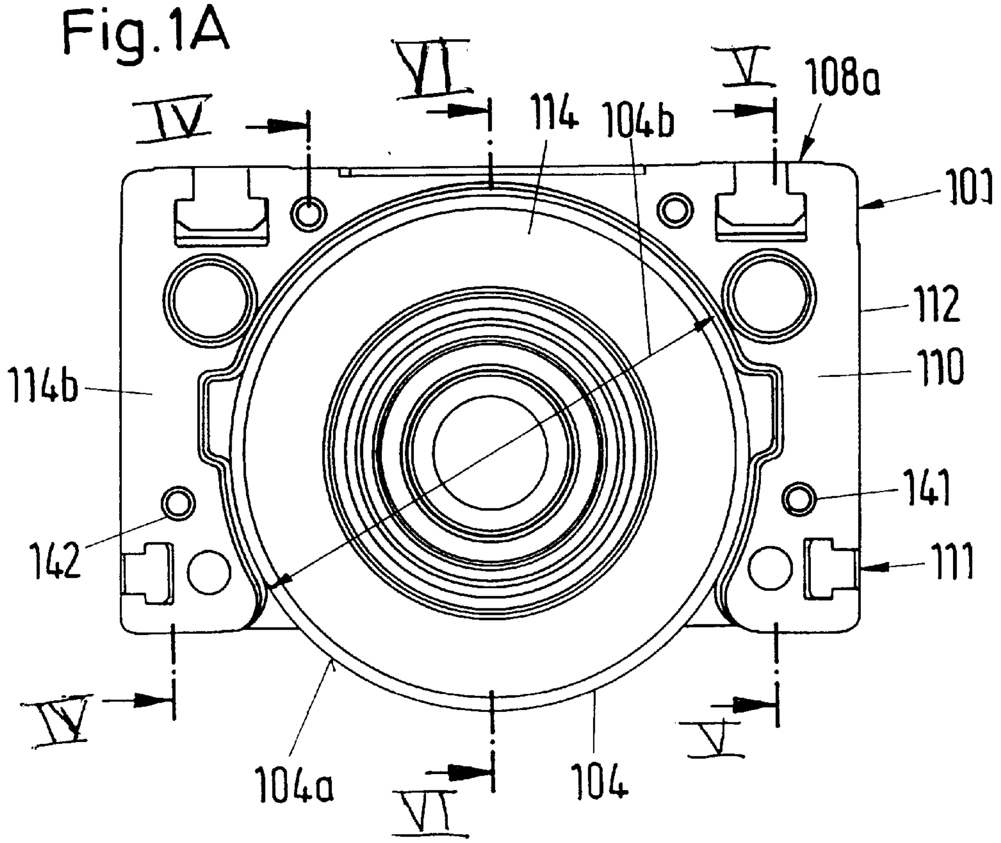
FIG. 1A is a front view of the entire wheel block pursuant to the present invention in the direction of a cheek.
Figure 6A:
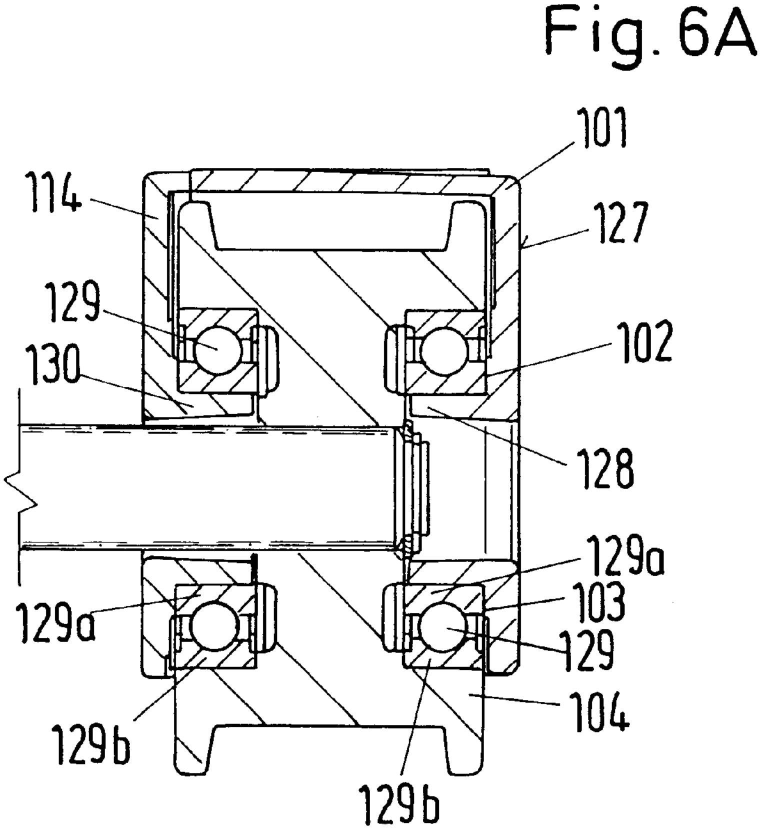
FIG. 6A is a cross-section VI—VI in FIG. 1A.
Figure 8A:
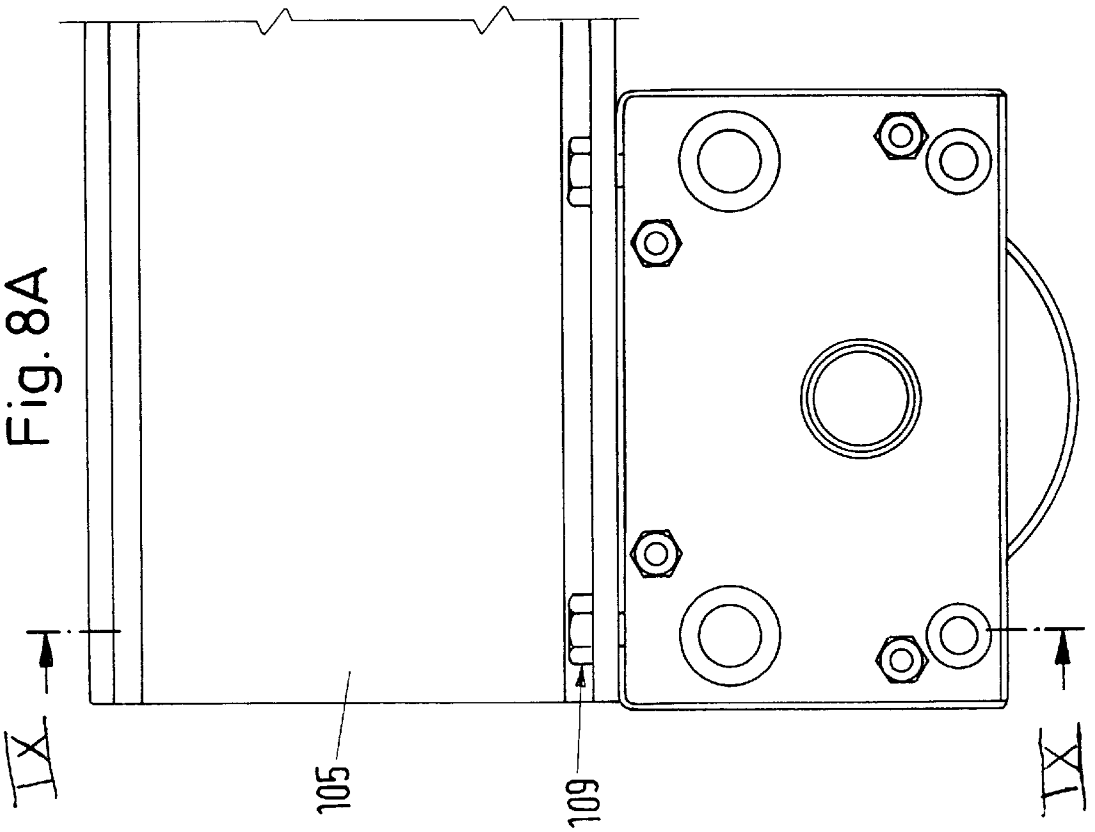

A running wheel block (FIGS. 1A and 2A) has a housing 101, in which there are rotary bearing seats 102 (cf. FIG. 6A) for slide and/or roller bearings 103 to accommodate a running wheel 104, which projects from the housing with a section of its running surface toward the bottom, i.e., toward one side. For removal of the slide and/or roller bearings 103 and/or the running wheel 104, at least toward one side, the housing 101 can be broken down into its component parts and then reconnected. A carrier or travelling frame 105 (cf. FIGS. 8A to 12A), to which the running wheel block is attached, determines the direction of removal.

The housing 101 is block-shaped, i.e., square, rectangular or trapezoidal when seen from the side, above or below. Its basic form can resemble a cube.

This block-type housing 101 has at least one head connecting surface 108, which absorbs the carrying force of the running wheel 104 and extends roughly to the housing width 106 or running wheel width 107. On the side 108*a* of the head connecting surface 108 are arranged the connecting means 109, e.g., connection screws 109*a*, nuts, bolts, rivets, etc. (cf. FIG. 8A) between the housing 101 and the carrier, travelling frame 105 or the like to be connected to the running wheel block.

Figure 2A:
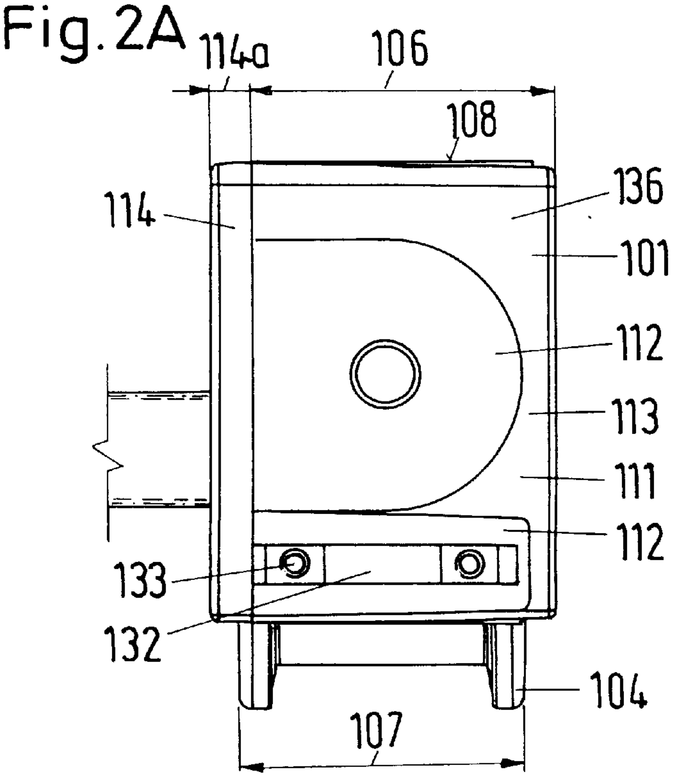
FIG. 2A is a side view for FIG. 1A of a front connecting surface.
Figure 7A:
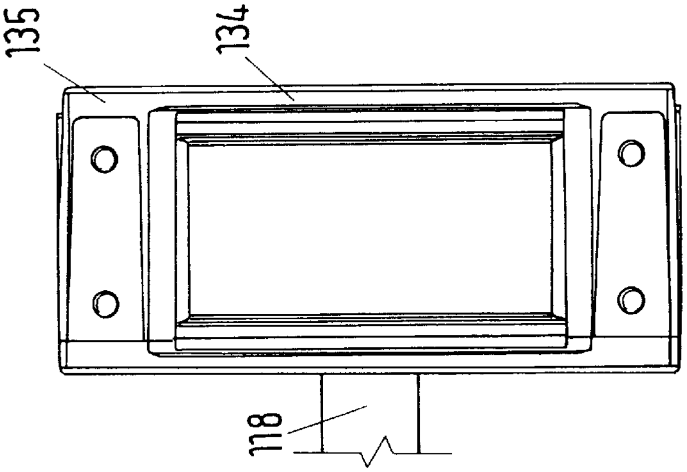
FIG. 7A is a view from below toward the wheel block.

The head connecting surface 108 and/or a cheek surface 110 and/or a front connecting surface 111 are divided into supported and non-supported partial surfaces 112, 113 (cf. FIGS. 2A and 7A). As a result, the introduction of force becomes more defined, and considerable savings are achieved in the metal removal rate and metal removal volume during manufacture of the running wheel block. The supported partial surfaces 112 absorb the given carrying force or partial carrying force. One supported partial surface 112 is itself undivided (it is also possible for there to be several such supported partial surfaces 112). This system of supported partial surfaces 112 and non-supported partial surfaces 113 ensures that the position of the entire running wheel block, after its adjustment on the carrier or travelling frame 105, is statically secure and unambiguously determined. Once assumed, this position can therefore be maintained, even before and during the exchange of slide and/or roller bearings, over practically the entire useful life of the running wheel block. It is advantageous for a supported partial surface 112 to be undivided, i.e., to have no partition line. The evenness of the surface can be produced more accurately with homogeneous material and smaller partial surfaces as the connecting surface than when several partial surfaces or large partial surfaces are used. Further, forces are introduced into the connecting structure in a defined manner via the smaller partial surfaces. This allows an optimized design of the connecting structure at a known force flow.

For the exchange process, a cover 114 is attached to at least one side (cheek surface 110) of the housing. The cover 114 closes the housing and is detachable in the installed state. In the operating position, the cover 114 is centered relative to the rotary bearing seats 102. As a result, lateral removal of the bearing and/or the running wheel is possible, which reduces the cost of disassembly and assembly.

For reasons of weight, but while maintaining carrying capacity to the full extent, the head connecting surface 108 has one or more through holes 115. Advantageously, the running wheel radius can thus be enlarged by more than the thickness of the upper plate limit. Further, it is advantageous that the through hole also prevents contaminating deposits in the event that the open side of the housing, from which the running wheel projects, is directed opposite to the direction of gravitation, i.e., is directed upward.

Figure 3A:
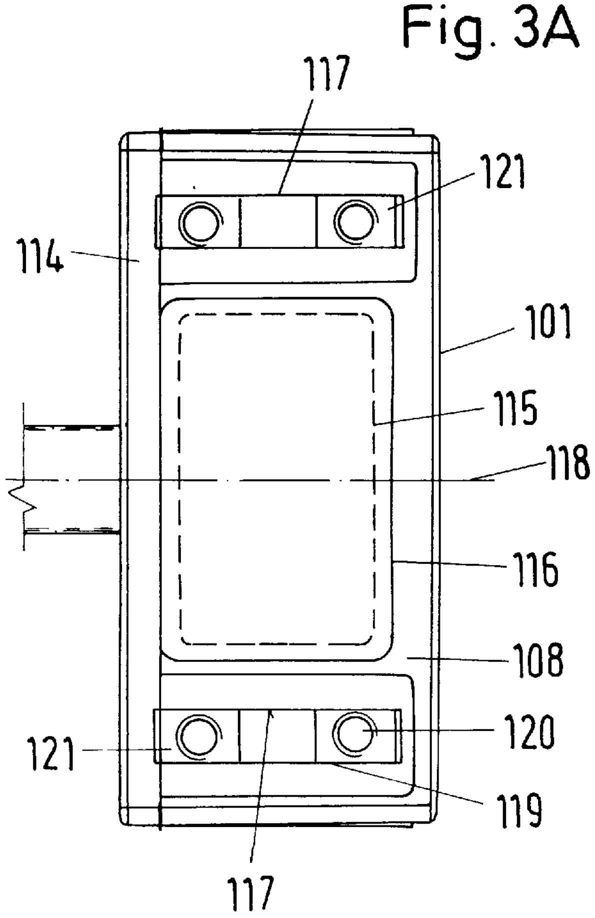
FIG. 3A is a top view of the head connecting surface.

The through holes 115 can be closable by means of closing pieces 116, which are manufactured from materials with low specific weight (cf. FIG. 3A). The closing pieces prevent the penetration of dirt or other impurities, even if the open side of the housing 101, from which the running wheel 104 projects, is directed in the gravitational direction, i.e., is directed downward.

The head connecting surface 108 has at least one recess 117 that runs parallel to the running wheel axis 118 (FIG. 3*a* shows two recesses). As a result, prefabricated bolts can be used, which in turn permit an imprecise hole pattern of the counterpiece to be used without disadvantages, because the bolts can move in the recess and adjust to the imprecise hole pattern. The recess 117 can be designed as a channel guide 119, a passage boring or a threaded bore 120. The suitable type of through hole can be selected in accordance with the precision of the connection. As shown in FIG. 3A, channel nuts 121 for the connecting means 109, which consist of the connecting screws 109*a*, are located in the channel guides 119. This embodiment facilitates the connection and orientation between the supporting framework, carrier, travelling frame 105 or the like and the housing 101 of the running wheel block during initial assembly.

For the aforementioned reasons of permanent attachment, the housing 101 is constructed asymmetrically, in that a lateral cover 114 is provided, whereby the housing width equals a multiple of the thickness 114*a* of the cover 114. Such a cover has various advantages, because, as a simple, plate-like part, it can be designed in various manners. It serves for the formation of locks and the attachment of sensor elements, and can be designed as an adapter for connection to a drive unit.

The width 106 of the housing 101 can, depending on the size and carrying force of the running wheel 104, be two to forty times the thickness 114*a* of the cover 114. The cover 114 is placed lower, relative to the head connecting surface 108, and thus absorbs no carrying forces and can, in the absence thereof, easily be disassembled in the stressed state.

In addition, the cover 114 is embodied so as to stand back relative to one front connecting surface 111. The cover 114 thus does not interfere with lateral support for the attachment of the running wheel block in a different manner (cf. FIG. 11A and 12A).

Further, the cover 114 has centering means 122*a* in the form of formed-on centering hubs 122, which engage into corresponding bores 123 in the housing 101. When the cover (114) is closed, the centering hubs 122 establish the position of the holding hub (128 or 130) relative to the running wheel axis 118.

Figure 5A:
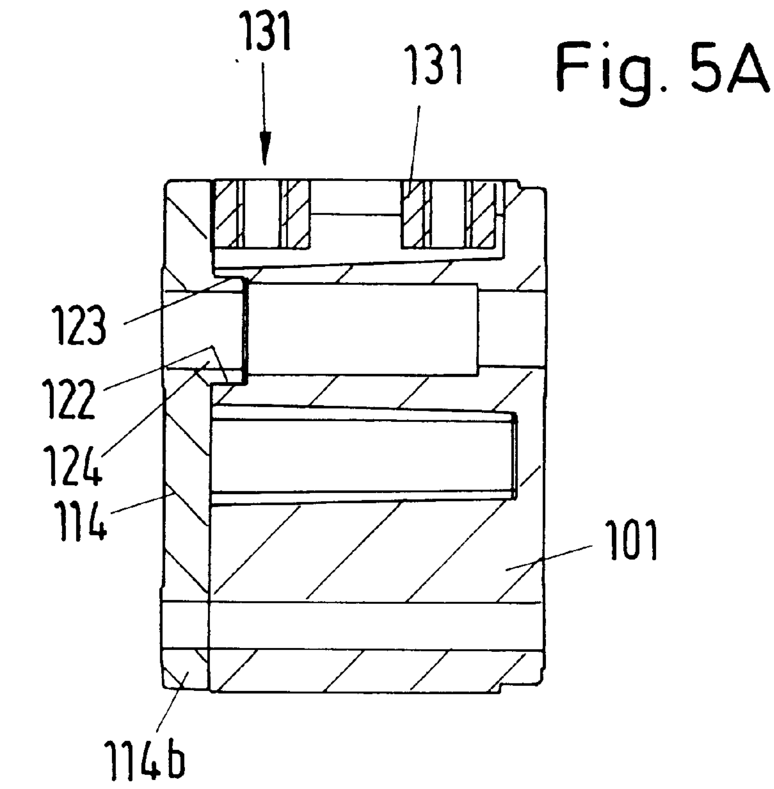
FIG. 5A is a cross-section V—V in FIG. 1A.

The cover 114 is connected to the housing 101 in a positive-locking manner via the centering hubs 122 (FIG. 5A) and in a force-locking manner via the connecting means 109. The connecting means 109 consist, for example, of connecting screws 109*a*.

Figure 4A:
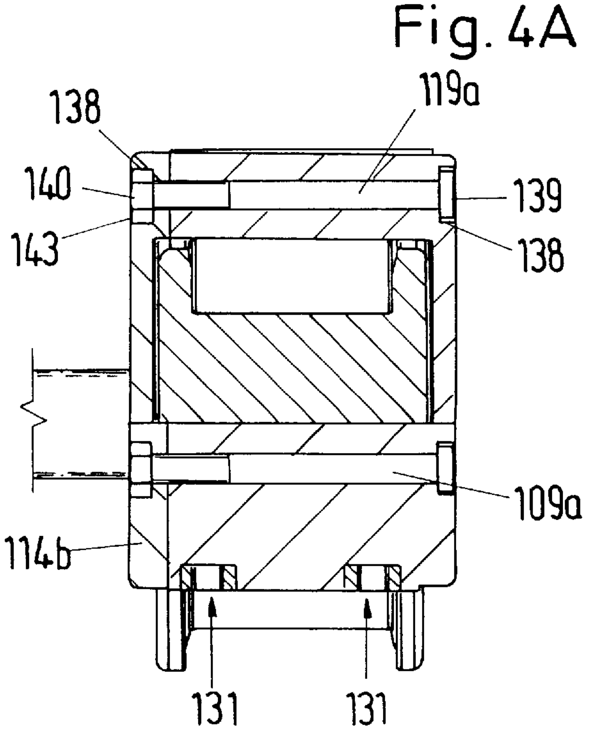
FIG. 4A is a section III—III as in FIG. 1A.

The cross-section 114*b* of the cover 114 becomes thicker outside of the running wheel diameter 104*b*. Worked into these thicker areas are sinks 138 for screw heads 139 and nuts 140. Attachment means, spacing means and the like can be located in these areas. The material necessary for doing so is available to an adequate extent at these thickened points. The sinks 138 can have a hexagonal shape 141 and, in alternating fashion, can accommodate an inner hexagonal head 142 (FIG. 1A) or a hexagonal nut (143) (FIG. 4A).

The centering hubs 122 have inner borings 124, which accommodate carrying bolts 125 and run concentric to the centering hub 122. This design ensures, in particular, good force transmission for the purpose of supporting the reaction forces in the housing of the running wheel block.

Figure 10A:
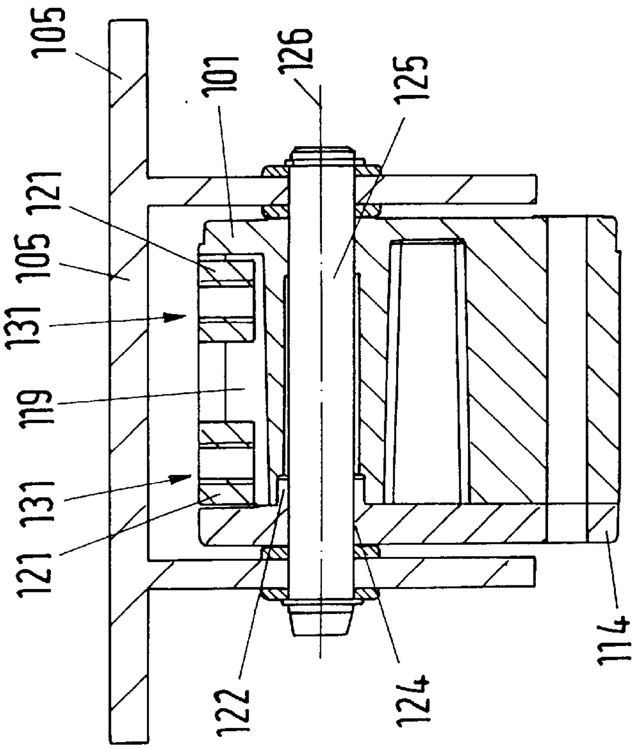

The centering hubs 122, the corresponding borings 123 in the housing 101, and the inner borings 124 run, with their common axis 126, outside of the circumference 104a of the running wheel 104 (cf. FIG. 1A) parallel to the running wheel axis 118 (FIG. 10A). Such a system is low-tolerance and can therefore be manufactured economically.

Arranged in the housing 101 are two inwardly directed holding hubs for rotary bearings. Thus, on the side 127 opposite to the cover 114, there is a formed-on holding hub 128 (FIG. 6A) for a rotary bearing 129 to accommodate the inner ring 129*a* or the outer ring 129*b*. As a result, the rotary bearing can be brought into its exact position easily and in a tolerance-correct manner by means of suitable manufacturing technology. On the cover 114 itself, there is a holding hub 130 (FIG. 6A) for the rotary bearing 129 to accommodate the inner ring 129*a* or the outer ring 129*b*, analogous to that described above on the housing 101.

On the head connecting surface 108 (FIG. 3A) and/or the outer front connecting surfaces 111 (FIG. 2A) of the housing 101, there are holding means 131 for the connecting means 109. The holding means 131 allow the connecting means 109 to be adjusted in keeping with the setting of the entire running wheel block. Along with the channel guides 119 (FIG. 10A) with channel nuts 121 provided on the head connecting surface 108, recesses 132 are provided on the front connecting surfaces 111 of the housing (FIG. 2A). As a result, additional elements can be attached without permanently configuring the front connecting surface. It is also possible to attach the entire wheel block located on this front connecting surface of the housing to a carrier or travelling frame or the like.

The respective recesses 117 or 132 (FIGS. 2A and 3A) are equipped as channel guides 119 and embodied either as passage bore 133 or as the threaded bore 120.

The housing 101 has, lying opposite outside the head connecting surface 108, an outer surface 134, a view of which is shown in FIG. 7A.

It is thus possible to attach other aggregates, e.g., guide rollers, measurements devices and the like, to this partial connecting surface. The partial connecting surface can also be embodied in such a way that the entire running wheel block on this surface can be connected to the supporting framework, carrier or travelling frame. The outer surface 134 is divided into partial connecting surfaces 135.

In contrast, the outer front connecting surfaces 111 of the housing 101 are not divided (FIG. 2A). Each constitutes an absorbing surface 136 for carrying forces.

To avoid corrosion and to save weight, the housing 101 and cover 114 can be injected or cast from molten materials. Manufacture by forging is also possible. The material can be a light metal alloy, for example, to ensure that the component in question has the desired stress capacity. An iron alloy can serve as a material of higher strength. Given lower stresses or carrying capacities, the material can consist of plastifiable plastic. Higher loadability of the wheel block is obtained by using composite materials or materials that form a composite material with other materials.

Figure 9A:
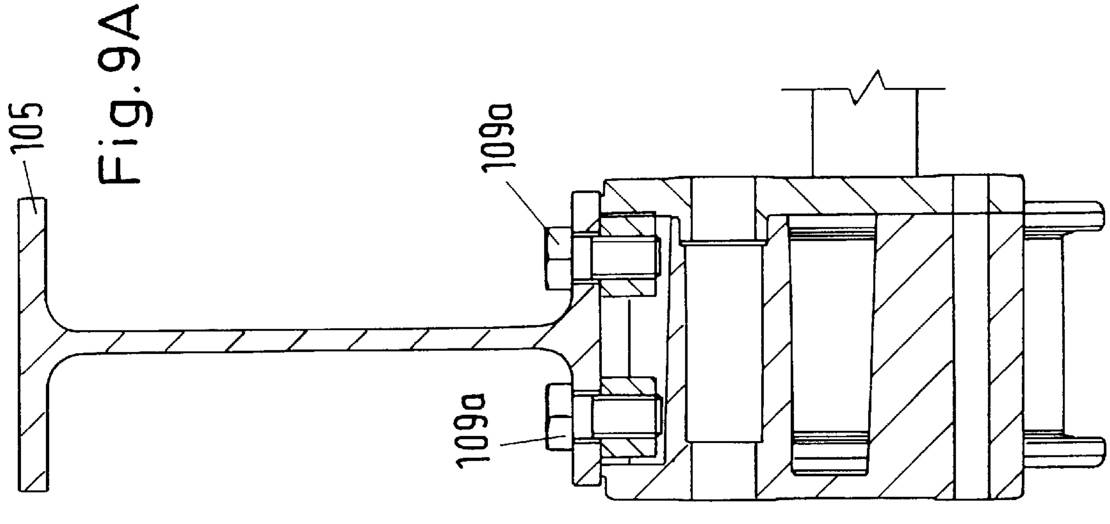
FIG. 9A is a cross-section of IX—IX in FIG. 8A.

FIGS. 9A and 10A illustrate that the mobility of the holding means 131 in the channel guide 119, together with the connecting means 109, permits a permanent adjustment of the wheel block on the travelling frame or the carrier 105 or the like. In FIG. 10A, the housing 101 is run and held between the legs of a U-shaped carrier 105.

Figure 12A:
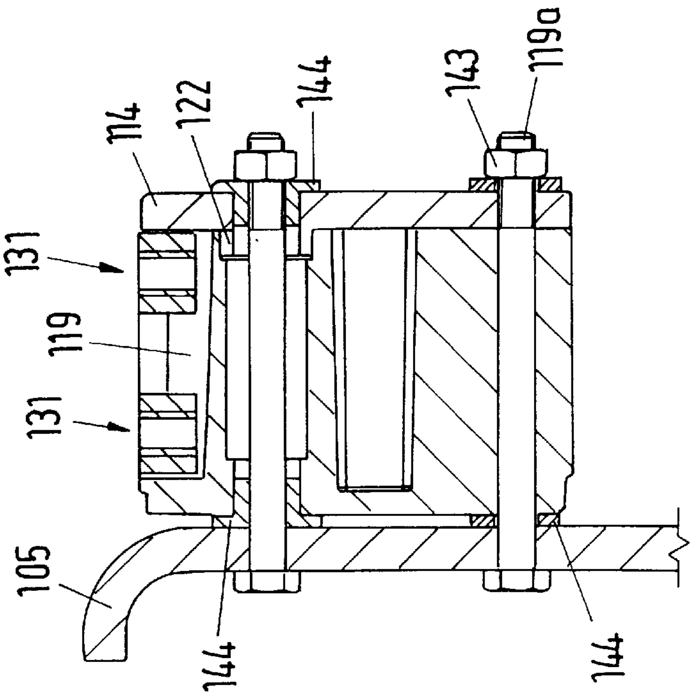
FIG. 12A is a section XII—XII in FIG. 11A.
Figure 11A:
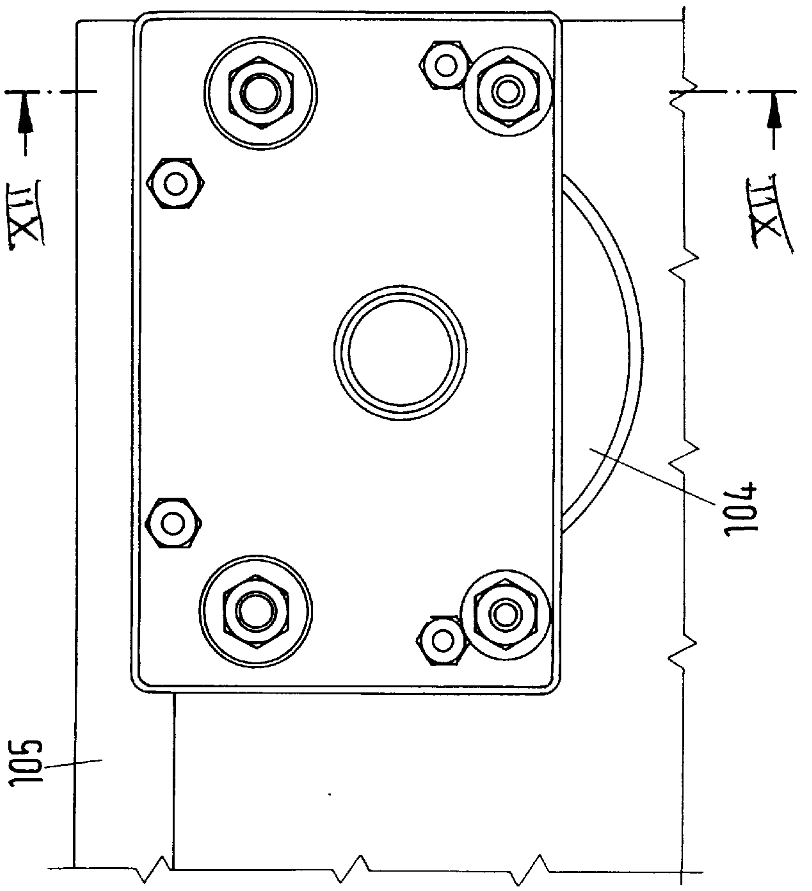
FIG. 11A is a view of a laterally attached wheel block, which is attached to a cheek surface.

FIGS. 11A and 12A show the attachment of the housing 101 and the cover 114 to the cheek surfaces 110 by means of the connecting screws 109*a*, hexagonal nuts 143 and adjustment bushings 144.

To summarize, what is essential is that one of two provided holding hubs (128, 130) is arranged on a cover (114) that closes the housing (101). Further, the cover (114) is connected to the housing (101), is detachable in the installed state and is equipped with centering means (122*a*) (centering hubs 122). When the cover (114) is closed, the centering means 122*a* (centering hubs 122) fix the position of the holding hub (128 or 130) relative to the position of the running wheel axis.

The invention is not limited by the embodiments described above which are presented as examples only but can be modified in various ways within the scope of protection defined by the appended patent claims.

We claim:

1. A running wheel block, comprising:

a housing having at least one connecting surface for connection to a supporting structure;

two inwardly directed rotary bearing holding hubs arranged in the housing;

rotary bearings mounted on the hubs;

a running wheel mounted in the rotary bearings so that a section of its running surface projects from the housing toward at least one side; and a cover connected to the housing so as to close the housing, the holding hubs including a first holding hub arranged on the cover, the cover having centering means for fixing a position of the holding hub relative to an axis of the running wheel when the cover is closed.

2. A running wheel block as defined in claim 1, wherein the centering means includes centering hubs.

3. A running wheel block as defined in claim 2, wherein the housing has bores, the centering hubs engaging into the bores in the housing.

4. A running wheel block as defined in claim 2, wherein the centering hubs have inner bores, and further comprising carrying bolts arranged in the inner bores so as to run concentric to the centering hub.

5. A running wheel block as defined in claim 1, wherein the housing is block-shaped and has at least one head connecting surface which absorbs carrying force and extends roughly to one of a complete width of the housing and a width of the running wheel, and further comprising means, arranged on a side of the head connecting surface, for connecting the housing and the supporting structure.

6. A running wheel block as defined in claim 5, wherein the head connecting surface has at least one through hole, and further comprising means for closing the through hole.

7. A running wheel block as defined in claim 5, wherein the head connecting surface has at least one recess that runs parallel to the running wheel axis.

8. A running wheel block as defined in claim 5, wherein the cover is arranged lower, relative to the head connecting surface.

9. A running wheel block as defined in claim 4, wherein the housing has a check surface and a front connecting surface, at least one of the head connecting surface, the cheek surface and the front connecting surface being divided into supported and non-supported partial surfaces.

10. A running wheel block as defined in claim 9, wherein the cover is configured so as to stand back relative to the front connecting surface.

11. A running wheel block as defined in claim 1, wherein the second holding hub is embodied in the housing on a side opposite to the cover and is configured to accommodate one of an inner ring and an outer ring of a rotary bearing, the first holding hub being configured to accommodate one of an inner ring and an outer ring of the rotary bearing.

12. A running wheel block as defined in claim 1, wherein the housing and the cover consist of a material that can be processed in a molten state.

13. A running wheel block as defined in claim 12, wherein the material of the housing and the cover is a light metal alloy.

* * * * *

Disclaimer and Dedication

5,931,584 — Eberhard Becker, Hagen (DE); Udo Gersemsky, Herdecke (DE); Winfried Gievers, Wetter (DE); Klaus-Peter Hoffmann, Schwerte (DE); Karl Liebig, Wetter (DE); Bernd Neupert, Wetter (DE); Hans-Hermann Osthoff, Wetter (DE); Thomas Schweflinghaus, Wuppertal (DE); Roland Staggl, Wetter (DE); Karl Zacharias, Schwerte (DE). RUNNING WHEEL BLOCK. Patent dated August 3, 1999. Disclaimer filed March 18, 2014, by the assignee, Demag Cranes & Components GmbH.

Hereby disclaims and dedicates to the public the entire term of all claims of said patent.

*(Official Gazette, April 22, 2014)*